(12) United States Patent
Golan et al.

(10) Patent No.: US 8,379,921 B1
(45) Date of Patent: Feb. 19, 2013

(54) METHOD AND APPARATUS TO DETERMINE A REGION OF INTEREST IN A VIDEO SEQUENCE BASED ON FLOOR DETECTION

(75) Inventors: Oren Golan, Or-Yehuda (IL); Shmuel Kiro, Rehovot (IL); Itshak Horovitz, Rishon Lezion (IL); Amir Sole, Rehovot (IL); Zvi Figov, Modiin (IL)

(73) Assignee: Verint Systems Ltd., Herzilya Pituach (IL)

( * ) Notice: Subject to any disclaimer, the term of this patent is extended or adjusted under 35 U.S.C. 154(b) by 205 days.

(21) Appl. No.: 13/014,044

(22) Filed: Jan. 26, 2011

Related U.S. Application Data

(60) Provisional application No. 61/298,440, filed on Jan. 26, 2010.

(51) Int. Cl.
*G06K 9/00* (2006.01)
*H04N 5/935* (2006.01)

(52) U.S. Cl. .......................... 382/103; 382/291; 386/211

(58) Field of Classification Search .................. 382/100, 382/103, 105–108, 154, 162, 168, 173, 181, 382/201, 232, 254, 274, 275, 276, 287–295, 382/305, 312, 170, 190; 386/211
See application file for complete search history.

(56) References Cited

U.S. PATENT DOCUMENTS

| | | | |
|---|---|---|---|
| 6,625,315 B2 * | 9/2003 | Laumeyer et al. | 382/190 |
| 7,444,003 B2 * | 10/2008 | Laumeyer et al. | 382/103 |
| 7,646,887 B2 * | 1/2010 | Goncalves et al. | 382/103 |
| 8,224,026 B2 * | 7/2012 | Golan et al. | 382/103 |
| 2008/0166045 A1 * | 7/2008 | Xu et al. | 382/170 |

* cited by examiner

*Primary Examiner* — Seyed Azarian

(57) ABSTRACT

A video system for determining a region of interest in a video comprising a video source and a video processing system is provided. The video processing system is configured to receive the video from the video source and identify at least one object in the video which is in contact with the floor. The video processing system is further configured to determine a contact point between the object and the floor in a frame of the video and identify at least one polygon representing the floor in the frame, wherein the polygon includes the contact point. The video processing system is further configured to identify a three dimensional volume representing a space above the polygon extending to a designated height and select the region of interest by identifying a two dimensional area of the frame based on the three dimensional volume.

14 Claims, 5 Drawing Sheets

METHOD AND APPARATUS TO DETERMINE A REGION OF INTEREST IN A VIDEO SEQUENCE BASED ON FLOOR DETECTION

RELATED APPLICATIONS

This application is related to and claims priority to U.S. Provisional Patent Application No. 61/298,440 entitled "Method and Apparatus to Determine a Region of Interest in a Video Sequence Based on Floor Detection" filed on Jan. 26, 2010, which is hereby incorporated by reference in its entirety.

TECHNICAL FIELD

Aspects of the invention are related, in general, to the field of video surveillance and monitoring.

TECHNICAL BACKGROUND

In the field of video analysis, software is developed and employed to process sequences of video images provided by a video camera or similar imaging device to generate information that is useful for any of a variety of applications, such as inventory tracking, traffic analysis, and queue control. Generally speaking, such applications involve the analysis of the location and/or movement of "objects", such as people, vehicles, products, or the like, within the images as the video sequence progresses. In many of these applications, the video analysis benefits from the identification of a "region of interest", or an area of each image of a video sequence to be analyzed. Identification of a region of interest may aid in reducing the amount of processing required to properly analyze the video sequence, and may also improve the accuracy of the information yielded from the processing.

OVERVIEW

A video system for determining a region of interest in a video comprising a video source and a video processing system. The video processing system is configured to receive the video from the video source and identify at least one object in the video which is in contact with the floor. The video processing system is further configured to determine a contact point between the object and the floor in a frame of the video and identify at least one polygon representing the floor in the frame, wherein the polygon includes the contact point. The video processing system is further configured to identify a three dimensional volume representing a space above the polygon extending to a designated height and select the region of interest by determining a two dimensional area of the frame based on the three dimensional volume.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

As mentioned above, for many video analysis applications, a determination of a particular region of interest within which the analysis of the video sequence is to be focused is beneficial. In at least some cases, the region (or regions) of interest is located relative to a floor or ground area of the physical area reflected in the images constituting the video sequence. For example, a region of interest may be a three-dimensional region located immediately above, and extending some predetermined distance up from, the floor. Thus, identification of the floor and the area which makes up the floor may be beneficial, and even instrumental, in determining a region of interest.

Figure 1:
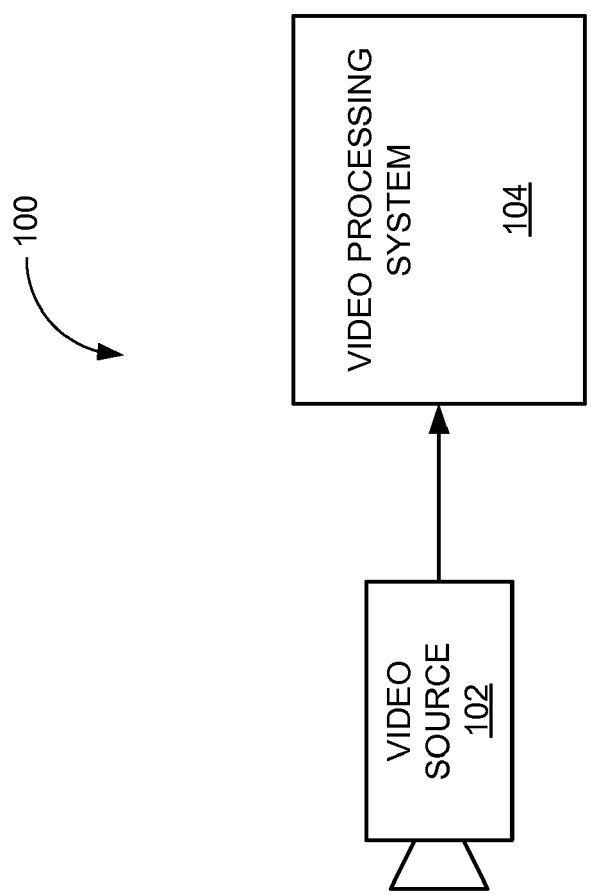
FIG. 1 illustrates a block diagram of an example of a video system.

FIG. 1 is a simplified block diagram of a video system 100 including a video source 102 coupled with a video processing system 104. The connection between the video source 102 and the video processing system 104 may use various communication media, such as air, metal, optical fiber, or some other signal propagation path, including combinations thereof. They may be direct links, or they might include various intermediate components, systems, and networks.

In an example embodiment, the video source 102 captures video including a sequence of video images of a scene that may include one or more objects. The video processing system 104 receives the video, and processes the portions of the video located within a region of interest across the sequence of images contained in the video.

Figure 2:
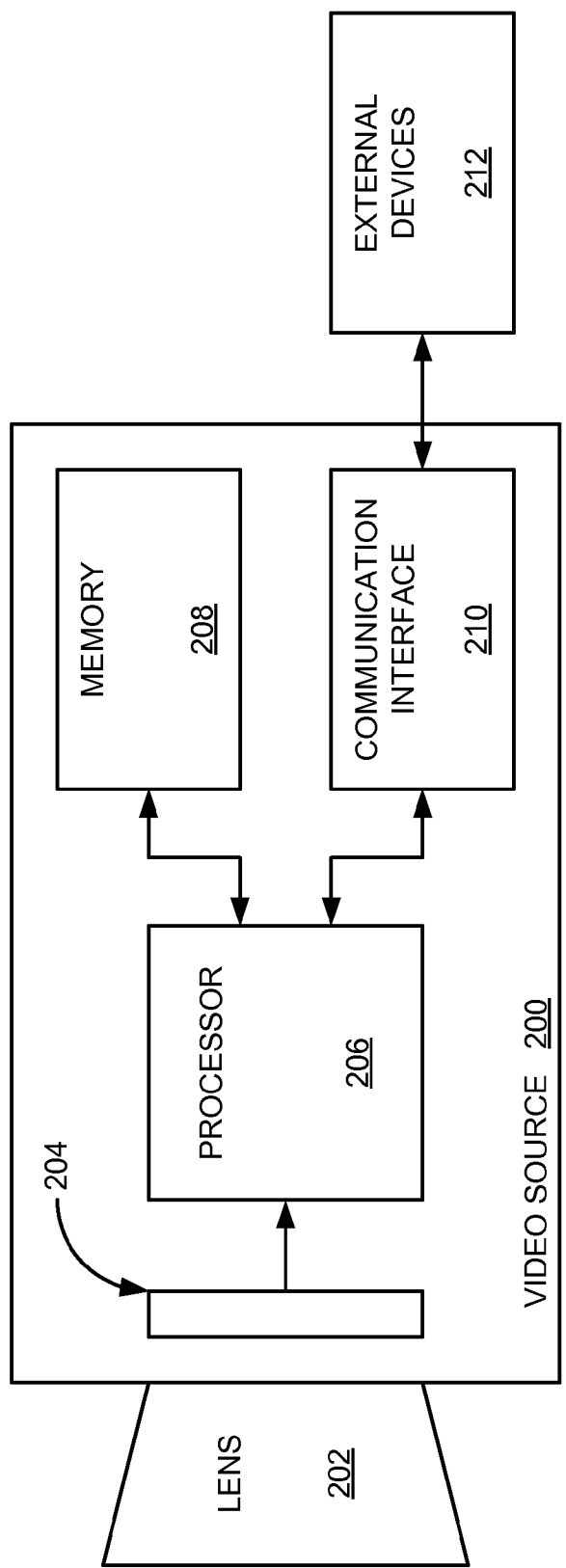
FIG. 2 illustrates a block diagram of an example of a video source.

FIG. 2 is a block diagram of an example of a video source 200, such as the video source 102 from FIG. 1. The video source 200 includes a lens 202, a sensor 204, a processor 206, memory 208, and a communication interface 210. The lens 202 is configured to focus an image of a scene or field of view on the sensor 204. The lens 202 may be any type of lens, pinhole, zone plate, or the like able to focus an image on the sensor 204. The sensor 204 digitally captures an image or video of the scene and passes the resulting video or images to the processor 206. The processor 206 is configured to store some or all of the video in memory 208, possibly process the video, and send the processed video to one or more external devices 212 through the communication interface 210. In some examples, the external devices 212 include the video processing system 104 of FIG. 1.

Figure 3:
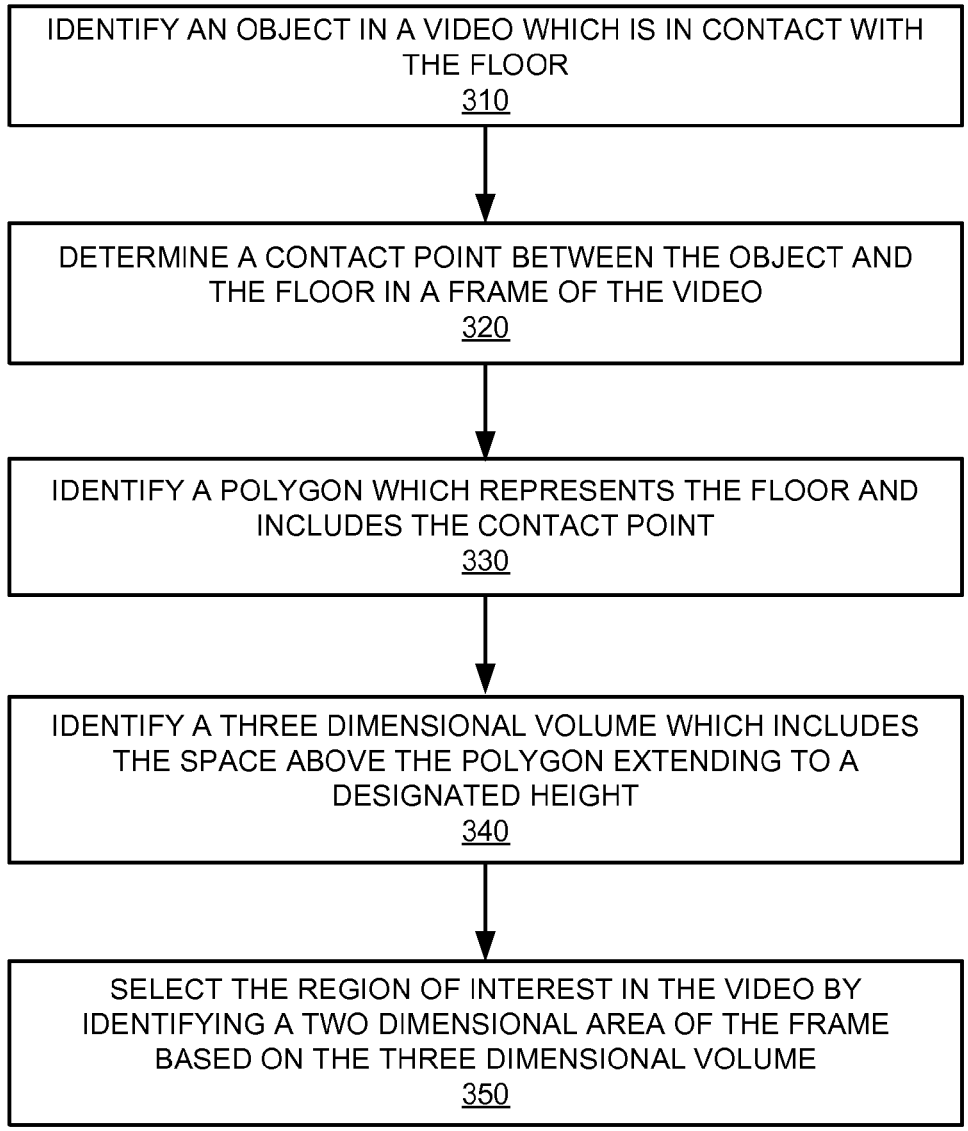
FIG. 3 illustrates an operation of a video system.

FIG. 3 illustrates an example operation of video system 100. The steps of operation are indicated below parenthetically. The video processing system 104 first identifies an object in a video, received from the video source 102, which is in contact with the floor (320). The video processing system 104 then determines a contact point between the object and the floor in a frame of the video (320). A polygon is identified which represents the floor and includes the contact point (330). The video processing system 104 identifies a three dimensional volume which includes the space above the polygon extending to a designated height (340). Finally, the video processing system 104 selects the region of interest in the video by identifying a two dimensional area of the frame based on the three dimensional volume (350).

Figure 4:
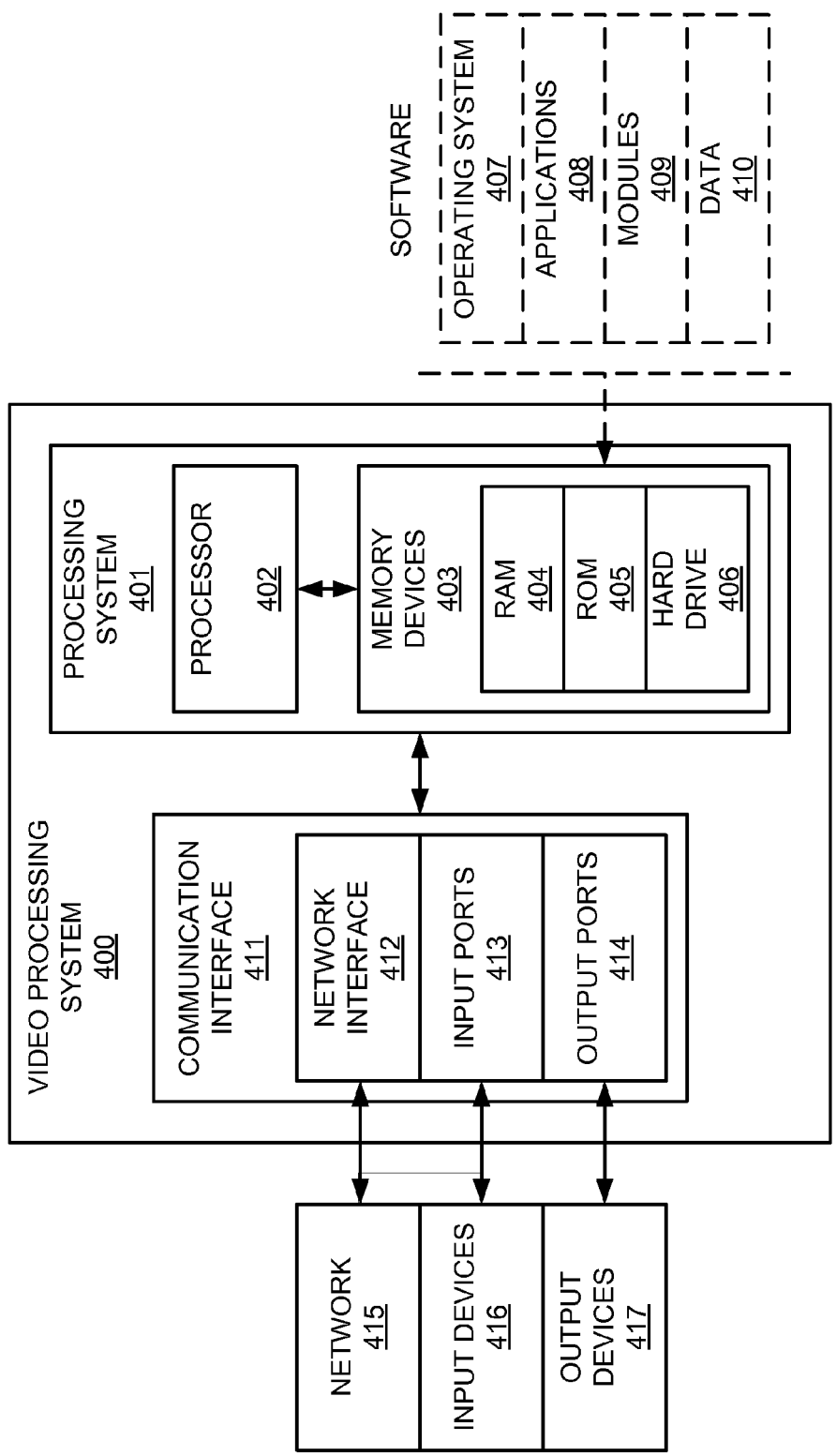
FIG. 4 illustrates a block diagram of an example of a video processing system.

Any of the embodiments discussed herein may be implemented on a computer system such as a video processing system 400 shown in FIG. 4. The video processing system 400 includes a communication interface 411 and a processing system 401. The processing system 401 is linked to the communication interface 411 through a bus. The processing system 401 includes a processor 402 and memory devices 403 that store operating software.

The communication interface 411 includes a network interface 412, input ports 413, and output ports 414. The communication interface 411 includes components that communicate over communication links, such as network cards, ports, radio frequency (RF) transceivers, processing circuitry and software, or some other communication devices. The communication interface 411 may be configured to communicate over metallic, wireless, or optical links. The communication interface 411 may be configured to use Time Division Multiplexing (TDM), Internet Protocol (IP), Ethernet, optical networking, wireless protocols, communication signaling, or some other communication format, including combinations thereof.

The network interface 412 is configured to connect to external devices over a network 415. In some examples, these external devices may include video sources and video storage systems. The input ports 413 are configured to connect to input devices 416, such as a keyboard, mouse, or other user input devices. The output ports 414 are configured to connect to output devices 417, such as a display, a printer, or other output devices.

The processor 402 includes a microprocessor or other circuitry that retrieves and executes operating software from the memory devices 403. The memory devices 403 include random-access memory (RAM) 404, read-only memory (ROM) 405, a hard drive 406, and/or any other memory apparatus. The operating software includes computer programs, firmware, or some other form of machine-readable processing instructions. In this example, the operating software includes an operating system 407, applications 408, modules 409, and data 410. The operating software in memory devices 403 may include other software or data as required by any specific embodiment. When executed by the processor 402, the operating software directs the processing system 401 to operate the video processing system 400 as described herein.

In an example, the video processing system 400 receives video of a scene, possibly including one or more objects from a video source (input devices 416) through the input ports 413 or the network interface 412 of the communication interface 411. This video, including a sequence of video images to be analyzed, may be stored in the memory devices 403. The processor 402 then processes the video to determine a region of interest within the images constituting the video sequence before subsequent processing of the images for desirable information occurs. The following description is directed to the determination of the region of interest.

In one embodiment, determining the region of interest may first include a calibration of one or more of the video images to be analyzed. Such calibration may include, for example, a determination of vanishing points and/or lines as determined by the perspective of the video source 102 of FIG. 1. Such information may be derived from extracting and analyzing multiple edges or similar identifiable line segments from a video image. Other data determined from the calibration may be scale information indicating the size of various objects at different locations within the image, which may be based on the actual height and/or width of one or more known objects presented in the image.

The images of the video sequence may be further processed using one or more object extraction techniques, such as background subtraction or detection of connected components, to extract one or more separate, identifiable "objects", such as people, animals, shelving units, shopping carts, vehicles, and so on. A typical product of this object extraction process may be an ellipse of inertia for each identified object. Generally, each ellipse of inertia is defined by a "major" or long axis and a "minor" or short axis, with the length of each axis indicating the overall length and width of the ellipse.

Figure 5:
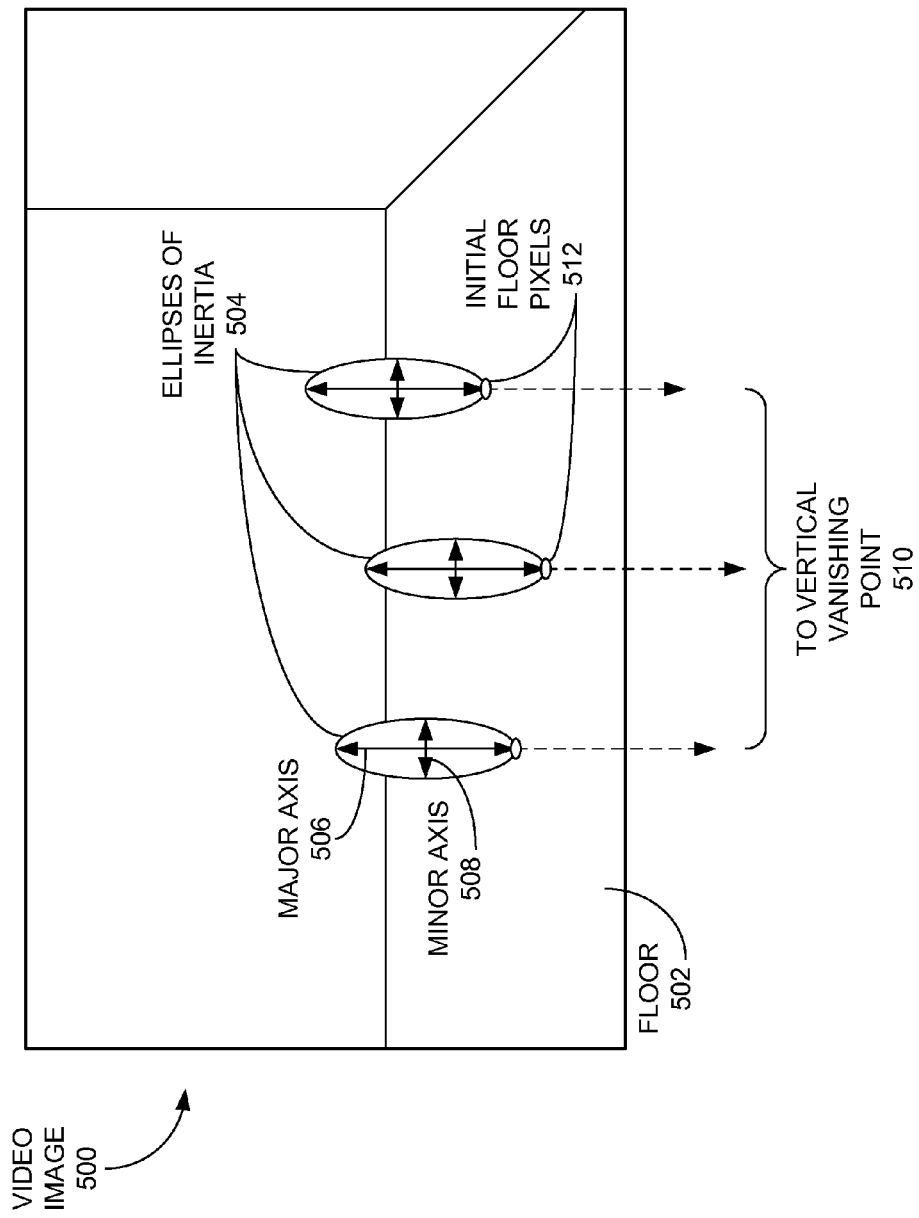
FIG. 5 illustrates a graphical representation of a video image processed by a video processing system.

Once the various objects, each represented by its ellipse of inertia, are extracted for each image, a subset of the objects may be chosen based on a set of criteria. FIG. 5 provides a view of selected objects as represented by ellipses of inertia 504 within a single video image 500. Such objects may be selected as being the most probable objects moving about a floor 502 of the video sequence, thus aiding in identifying the floor 502 in the image 500. In one example, only the ellipses 504 which change location within the scene from image 500 to another instance of image 500 in a substantially smooth or non-jittery fashion over a period of time of at least a few seconds may be selected initially.

Another of the selection criteria may be that the major axis 506 of the ellipse 504 aligns with a vertical vanishing point 510 determined in the previous calibration operation, possibly along with the minor axis 508 aligning with a horizontal vanishing line (not shown in FIG. 5) of the image 500, thus indicating an upright orientation of the associated object relative to the image 500. Additionally, the ratio of the minor axis 508 to the major axis 506 for a selected ellipse 504 may be required to reside within a predetermined range. In one example, the range may be between 1:2.5 and 1:4.

Yet another selection criterion for the ellipses may be that the range of height of the object represented by the ellipse 504 must be within a predetermined range, such as between 1.6 meters (approximately 5 feet, 3 inches) and 2.1 meters (approximately 6 feet, 11 inches). To calculate the height of an object, the associated ellipse 504 is presumed to be touching the floor 502. Based on the location of the lower end of the major axis 506 of the ellipse 504 within the image 500, and on the scale information generated by the calibration operation, the height of the object represented by the ellipse 504 may be calculated based on the length of the major axis 506.

The embodiment described above may be particularly suited to identify those objects which are likely to be adult people moving about the floor 502 of the scene displayed in the images 500 of the video sequence. To detect other objects, such as vehicles or shopping carts, a different set of selection criteria may be employed.

Once the set of objects represented by the selected ellipses of inertia 504 likely to be in contact with the floor 502 have been identified, at least one initial floor pixel 512 of one or more of the images 500 of the video sequence that is adjacent to each of the selected ellipses 504 representing the objects in question may be determined. As shown in FIG. 5, at least one initial image pixel at the intersection of the boundary of each ellipse 504 with the lower end of the major axis 506 (i.e., the end of the major axis 506 closest to the vertical vanishing point 510) is considered to be an image pixel of the floor 500. This identification results in one or more initial floor pixels 512 being identified for each of the selected ellipses 504.

Given the set of initial floor pixels 512 determined in the previous operation, the remaining image pixels belonging to the floor 502 may be discovered. In one implementation, a color segmentation algorithm may be employed to divide the pixels of the video image 500 into a number of two-dimensional segments based on the color of the pixels constituting the video image 500. Each of the resulting segments that include at least one of the initial floor pixels 512 may be classified as floor segments, with all remaining segments, at least temporarily, being considered non-floor segments.

Further processing may be performed on the floor and non-floor segments, possibly resulting in at least some of the non-floor segments being reclassified as floor segments. In one implementation, this processing may include a series of operations repeated on the floor and non-floor segments until no new floor segments are generated. For example, if a non-floor segment is adjacent a floor segment, and the pixels defining a border between the non-floor segment and the floor segment are of a similar color to that of the non-floor segment and the floor segment, the non-floor segment may be converted to a floor segment.

Further, again presuming a border between a non-floor segment and a floor segment, and the color of the pixels located close to one side of the border (e.g., two pixels away from the border) is similar to those similarly situated on the other side of the border, the non-floor segment may be converted into a floor segment. Such a conversion may be useful in cases in which the two segments represent separate, but adjacent, floor tiles.

In another example of operation, if a group of non-floor segments is surrounded by floor segments, and the area of the non-floor segment is less than some predetermined size, the non-floor segment may be converted to a floor segment. In other embodiments, any, all, or none of the above operations may be performed in any sequence to identify a final set of floor segments.

Once the operation sequence has been repeated without any new non-floor segments being converted to floor segments, the resulting floor segments are utilized to identify at least one polygon representing the floor 502 in the video image 500 of the video sequence. For example, to begin this portion of the process, the largest convex polygon completely belonging to the union of the floor segments is chosen. If the remaining pixel area of the floor segments exceeds some predetermined level, a next largest polygon located completely within the remaining floor segment pixels is selected. This process may continue until the number of remaining floor segment pixels not located within a polygon is less that the predetermined amount. Thus, the resulting polygons are considered to represent the floor 502. Any common boundaries among the polygons may be eliminated at this point to form fewer, larger polygons.

Given the polygons representing the floor 502, the region of interest of the video sequence associated with the floor 502 may then be ascertained. In this implementation, the region of interest comprises at least one area of the video image 500 of the video sequence representing a three-dimensional space or volume above the one or more polygons representing the floor 502 in the image. In one example, the polygons are intersected by a plurality of lines parallel to the horizontal vanishing line. Using these lines, a sample object of predetermined shape and size may be located at various locations along the lines atop the polygons representing the floor 502, with each location producing a projection of the object onto the image 500. In one implementation, each projection may be considered a visual mass whose area in pixels exceeds some predetermined value. The union of these projections may then be regarded as the image 500 region of interest.

Although several of the previous operations described above are discussed in regard to a single image 500 of the video sequence, such operations may be performed on multiple images 500, the results of which may then be combined to determine the region of interest for the video sequence.

A summary of one implementation of the automated detection of a region of interest in a sequence of video images as described above is presented hereinafter:

(1) Utilize the data obtained from calibration to determine vanishing points and scale.

(2) Employ one or more object extraction techniques, such as background subtraction and detection of connected components.

(3) From the extracted objects, represented by their ellipses of inertia, select those objects with the following criteria:

(3.1) Smooth changes of ellipse locations with respect to time in video sequence lasting at least a few seconds.

(3.2) The major axis of an ellipse is close to the direction from the ellipse center to the (vertical) vanishing point while the minor one is coincidental with the (horizontal) vanishing line. The ratio of the axes is between 1:2.5 and 1:4.

(3.3) Consider the pixels located on the intersection of the ellipse boundary and the line through the (vertical) vanishing point. Under the presumption that one of the points belongs to the floor, compute, from the calibration data, the distance between these points (i.e., the height of the object represented by the ellipse). Select objects with height between 1.6 and 2.1 meters.

(4) The collection of image pixels belonging to the intersection of ellipse boundaries and lines through the ellipse center and vertical vanishing point (i.e., the ones closer to the vanishing point) of ellipses described in operations (3.1) through (3.3) are considered as image pixels belonging to the floor.

(5) Image pixels belonging to the floor are processed as follows:

(5.1) Apply a color segmentation algorithm on the image. All of the segments that contain a floor pixel (as obtained in operation (3)) are classified as floor segments.

(5.2) If a segment is near a floor segment and the border between them has a similar color, it turns into a floor segment.

(5.3) For two segments in which one is a floor segment: If the color of the pixels that are two pixels away from the border between the segments in both sides is similar, then convert it into floor segment. This is done in order to get over things like floor tiles.

(5.4) If a group of non-floor segments is surrounded by floor segments, and the group area is small enough, mark the non-floor segments as floor segments.

(5.5) Repeat operations (5.1) through (5.4) until no new floor segments are created.

(6) The largest convex polygon completely belonging to the pixel region is chosen. If the remaining pixel area is sufficiently large, repeat this procedure until the area of the remaining parts is smaller than a predefined number. The common parts of the boundaries of the polygons are eliminated.

(7) The polygons are intersected by lines parallel to the horizontal vanishing line in order to achieve the following: the projection to the image of an object of predefined metric dimensions is represented by an area which has a pixel count which exceeds a predefined count. These regions are marked as the image region of interest.

Various embodiments described above provide an automatically-generated region of interest for a video sequence that includes a representation of a floor and various objects located thereon. Once the region of interest has been determined, any subsequent video analysis of objects located within the region may commence.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for determining a region of interest in a video, the method comprising:
    identifying a vertical vanishing point for a frame of the video;
    identifying an elliptically shaped object with a major axis which is aligned with the vertical vanishing point;
    determining a contact point on the major axis of the elliptically shaped object closest to the vertical vanishing point;
    identifying at least one polygon representing the floor in the frame, wherein the at least one polygon comprises the contact point;
    identifying a three dimensional volume representing a space above the at least one polygon extending to a designated height; and
    selecting the region of interest by identifying a two dimensional area of the frame based on the three dimensional volume.

2. The method of claim 1 wherein the elliptically shaped object is moving.

3. The method of claim 1 wherein the elliptically shaped object has a height in the range from 1.6 meters to 2.1 meters.

4. The method of claim 1 wherein the at least one polygon is comprised of areas of the frame which have a similar color.

5. The method of claim 1 wherein the three dimensional volume is identified using horizontal vanishing lines and vertical vanishing lines.

6. A video system comprising:
    a video source; and
    a video processing system configured to:
        receive video from the video source;
        identify a vertical vanishing point for a frame of the video;
        identify an elliptically shaped object with a major axis which is aligned with the vertical vanishing point;
        determine a contact point on the major axis of the elliptically shaped object closest to the vertical vanishing point;
        identify at least one polygon representing the floor in the frame, wherein the at least one polygon comprises the contact point;
        identify a three dimensional volume representing a space above the at least one polygon extending to a designated height; and
        select a region of interest by identifying a two dimensional area of the frame based on the three dimensional volume.

7. The video system of claim 6 wherein the elliptically shaped object is moving.

8. The video system of claim 6 wherein the elliptically shaped object has a height in the range from 1.6 meters to 2.1 meters.

9. The video system of claim 6 wherein the at least one polygon is comprised of areas of the frame which have a similar color.

10. The video system of claim 6 wherein the three dimensional volume is identified using horizontal vanishing lines and vertical vanishing lines.

11. A non-transitory computer readable medium having program instructions stored thereon that, when executed by a video processing system, direct the video processing system to:
    identify a vertical vanishing point for the frame; and
    identify an elliptically shaped object with a major axis which is aligned with the vertical vanishing point;
    determine a contact point on the major axis of the elliptically shaped object closest to the vertical vanishing point;
    identify at least one polygon representing the floor in the frame, wherein the at least one polygon comprises the contact point;
    identify a three dimensional volume representing a space above the at least one polygon extending to a designated height; and
    select a region of interest by identifying a two dimensional area of the frame based on the three dimensional volume.

12. The non-transitory computer readable medium of claim 11 wherein the elliptically shaped object is moving.

13. The non-transitory computer readable medium of claim 11 wherein the elliptically shaped object which has a height in the range from 1.6 meters to 2.1 meters.

14. The non-transitory computer readable medium of claim 11 wherein the three dimensional volume is identified using horizontal vanishing lines and vertical vanishing lines.

* * * * *